United States Patent
Reynolds et al.

(10) Patent No.: US 8,164,429 B2
(45) Date of Patent: Apr. 24, 2012

(54) OPERATIONAL-STATE RESPONSIVE AUDIOVISUAL SYSTEMS

(75) Inventors: Jeffrey W. Reynolds, East Aurora, NY (US); Richard A. Zirnheld, Niagra Falls, NY (US)

(73) Assignee: Mattel, Inc., El Segundo, CA (US)

( * ) Notice: Subject to any disclaimer, the term of this patent is extended or adjusted under 35 U.S.C. 154(b) by 642 days.

(21) Appl. No.: 12/361,832

(22) Filed: Jan. 29, 2009

(65) Prior Publication Data

US 2010/0026477 A1 Feb. 4, 2010

Related U.S. Application Data

(60) Provisional application No. 61/137,704, filed on Jul. 31, 2008, provisional application No. 61/137,500, filed on Jul. 30, 2008.

(51) Int. Cl.
*B60Q 1/00* (2006.01)
(52) U.S. Cl. ............... 340/425.5; 340/384.1; 340/384.4; 340/384.7; 280/29; 180/282
(58) Field of Classification Search ............... 340/425.5, 340/384.1, 384.4, 384.7, 441, 438, 660, 661, 340/388.7, 468, 693.5; 280/828, 1.13, 1.16, 280/200, 29; 180/197, 282, 65.51; 446/468; 701/22
See application file for complete search history.

(56) References Cited

U.S. PATENT DOCUMENTS

| | | | |
|---|---|---|---|
| 2,882,834 A | 4/1959 | Smith | |
| 3,165,595 A | 1/1965 | Noshiro | |
| 3,339,307 A | 9/1967 | Floyd et al. | |
| 3,425,156 A | 2/1969 | Field | |
| 3,664,060 A | 5/1972 | Longnecker | |
| 4,291,877 A | 9/1981 | Ensmann et al. | |
| 4,701,750 A | 10/1987 | Wilkinson et al. | |
| 4,932,913 A | 6/1990 | Raviv et al. | |
| 4,946,416 A | 8/1990 | Stern et al. | |
| 4,949,068 A | 8/1990 | Johnston et al. | |
| 4,964,837 A | 10/1990 | Collier | |
| 5,045,016 A | 9/1991 | Stern et al. | |
| 5,088,955 A | 2/1992 | Ishimoto | |
| 5,195,920 A | 3/1993 | Collier | |

(Continued)

FOREIGN PATENT DOCUMENTS

EP 0446881 4/1995

(Continued)

*Primary Examiner* — Anh V La
(74) *Attorney, Agent, or Firm* — Dascenzo Intellectual Property Law, P.C.

(57) ABSTRACT

A children's ride-on vehicle is disclosed. In some embodiments, the vehicle may include at least one driven wheel and a drive assembly adapted to selectively drive the rotation of the at least one driven wheel. The drive assembly may include at least one electric motor, a battery assembly including at least one battery and adapted to provide a plurality of voltages to the at least one electric motor, and at least one user input device positioned to receive inputs from a child sitting on the at least one seat, and adapted to select among the plurality of voltages and to apply that selected voltage to the at least one electric motor; and an electronics system adapted to detect the applied voltage to the at least one electric motor and to generate at least one of an audio output and a visual output based, at least in part, on the applied voltage.

18 Claims, 4 Drawing Sheets

U.S. PATENT DOCUMENTS

| | | | |
|---|---|---|---|
| 5,237,617 A | 8/1993 | Miller | |
| 5,314,372 A | 5/1994 | Kramer | |
| 5,409,263 A * | 4/1995 | Klawitter | 280/827 |
| 5,635,903 A | 6/1997 | Koike et al. | |
| 5,702,283 A | 12/1997 | Watson, Jr. et al. | |
| 5,820,442 A | 10/1998 | Helder | |
| 5,835,605 A | 11/1998 | Kunimoto | |
| 6,150,947 A | 11/2000 | Shima | |
| 6,171,171 B1 * | 1/2001 | Barthold | 446/438 |
| 6,250,987 B1 | 6/2001 | Choi | |
| 6,275,590 B1 | 8/2001 | Prus | |
| 6,356,185 B1 | 3/2002 | Plugge et al. | |
| 6,406,049 B1 | 6/2002 | Jimison et al. | |
| 6,416,381 B1 | 7/2002 | Walter et al. | |
| 6,522,244 B2 | 2/2003 | Huntsberger et al. | |
| 6,656,010 B1 | 12/2003 | Bienz et al. | |
| 6,725,150 B1 | 4/2004 | Glandian | |
| 6,959,094 B1 | 10/2005 | Cascone et al. | |
| 7,088,829 B1 | 8/2006 | Schick et al. | |
| 2004/0170288 A1 | 9/2004 | Maeda | |
| 2005/0175186 A1 | 8/2005 | Yasushi et al. | |
| 2006/0231303 A1 | 10/2006 | Fobean et al. | |

FOREIGN PATENT DOCUMENTS

GB 2452119 A 2/2009

* cited by examiner

OPERATIONAL-STATE RESPONSIVE AUDIOVISUAL SYSTEMS

CROSS-REFERENCE TO RELATED APPLICATIONS

This application claims priority under 35 U.S.C. §119(e) to U.S. Provisional Patent Application Ser. No. 61/137,704 entitled "Operational-State Responsive Audiovisual Systems," filed Jul. 31, 2008, and U.S. Provisional Patent Application Ser. No. 61/137,500 entitled "Operational-State Responsive Audiovisual Systems," filed Jul. 30, 2008. The complete disclosures of the above applications are herein incorporated by reference for all purposes.

BACKGROUND OF THE DISCLOSURE

The present disclosure is directed to audiovisual systems that are responsive to the operational-state of children's ride-on vehicles and children's ride-on vehicles having one or more of those systems. Examples of audiovisual systems include U.S. Pat. Nos. 7,088,829; 6,959,094; 6,725,150; 6,416,381; 6,406,049; 6,356,185; 6,275,590; 6,250,987; 6,150,947; 5,835,605; 5,820,442; 5,702,283; 5,635,903; 5,314,372; 5,237,617; 5,195,920; 5,088,955; 5,045,016; 4,964,837; 4,949,068; 4,946,416; 4,932,913; 4,701,750; 4,291,877; U.S. Patent Application Publication Nos. 2006/0231303; 2005/0175186; and 2004/0170288; and European Patent No. 0446881. The complete disclosures of the above patents and patent applications are herein incorporated by reference for all purposes.

SUMMARY OF THE DISCLOSURE

The present disclosure is directed to electronic systems adapted to detect applied voltage to at least one electric motor and to generate at least one of an audio output and a visual output based, at least in part, on the applied voltage, and children's ride-on vehicles including one or more of those systems.

The children's ride-on vehicles may, in some embodiments, include a body having at least one seat sized for a child; a plurality of wheels rotatably coupled to the body, wherein the plurality of wheels includes at least one driven wheel; and a drive assembly adapted to selectively drive the rotation of the at least one driven wheel. The drive assembly may, in some embodiments, include at least one electric motor, a battery assembly including at least one battery and adapted to provide a plurality of voltages to the at least one electric motor, and at least one user input device positioned to receive inputs from a child sitting on the at least one seat, and adapted to select among the plurality of voltages and to apply that selected voltage to the at least one electric motor; and an electronics system adapted to detect the applied voltage to the at least one electric motor and to generate at least one of an audio output and a visual output based, at least in part, on the applied voltage.

The electronics system may, in some embodiments, be adapted to detect the applied voltage to the at least one electric motor and to generate at least one of an audio output and a visual output based, at least in part, on the applied voltage, wherein each of the plurality of voltages corresponds to a different drive configuration of the drive assembly when that voltage is applied to the at least one electric motor.

In some embodiments, the electronics system may be adapted to (1) detect the applied voltage to the at least one electric motor and to generate at least one of an audio output and a visual output based, at least in part, on the applied voltage, (2) interrupt the generation of the at least one of an audio output and a visual output when the electronics system detects a change in the applied voltage to the at least one electric motor, and (3) generate at least one of a different audio output and a different visual output after interrupting the generation of the at least one of an audio output and a visual output based, at least in part, on the changed voltage to the at least one electric motor.

DETAILED DESCRIPTION OF THE DISCLOSURE

Figure 1:
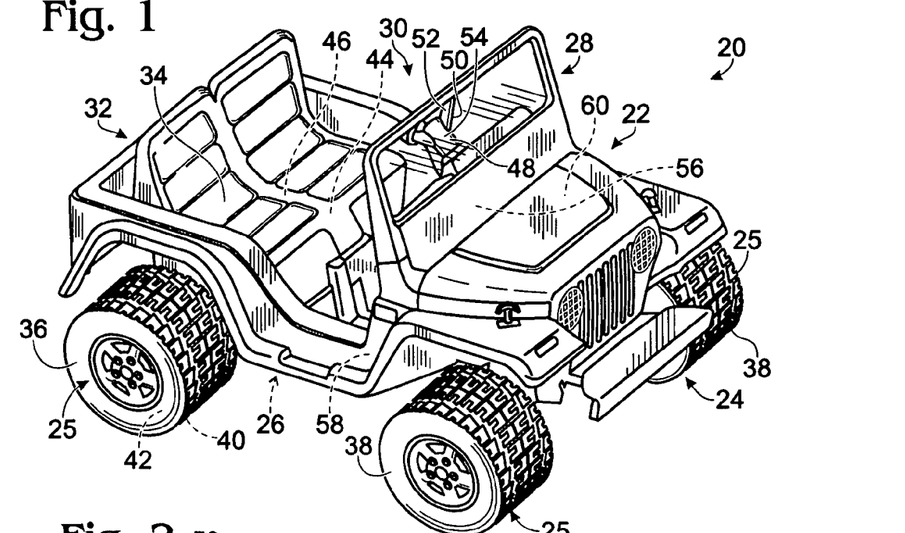
FIG. 1 is an isometric view of a children's ride-on vehicle including an operational-state responsive audiovisual system.
Figure 2:
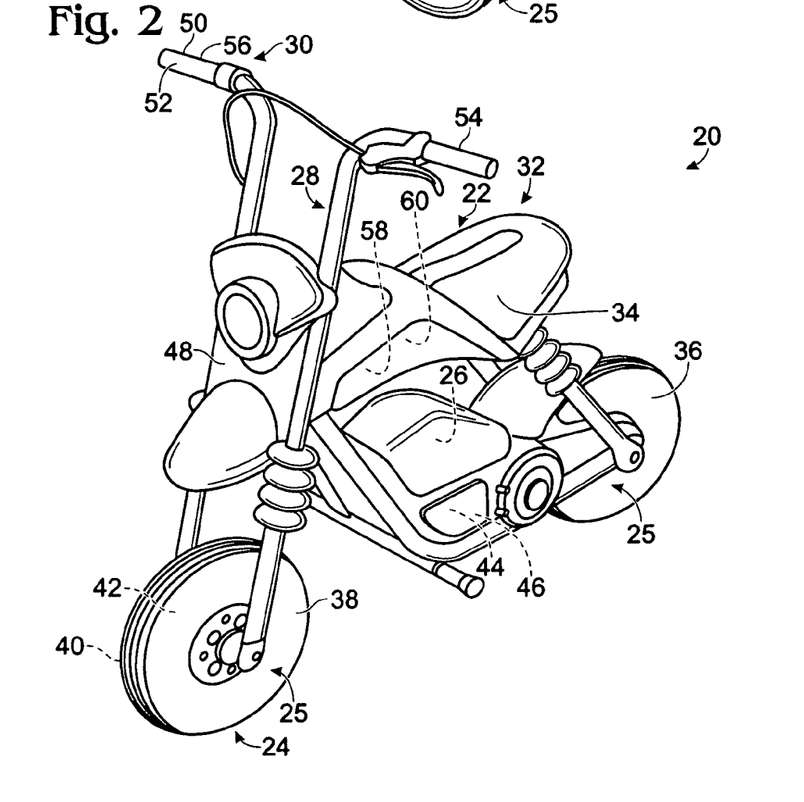
FIG. 2 is an isometric view of another children's ride-on vehicle including an operational-state responsive audiovisual system.
Figure 3:
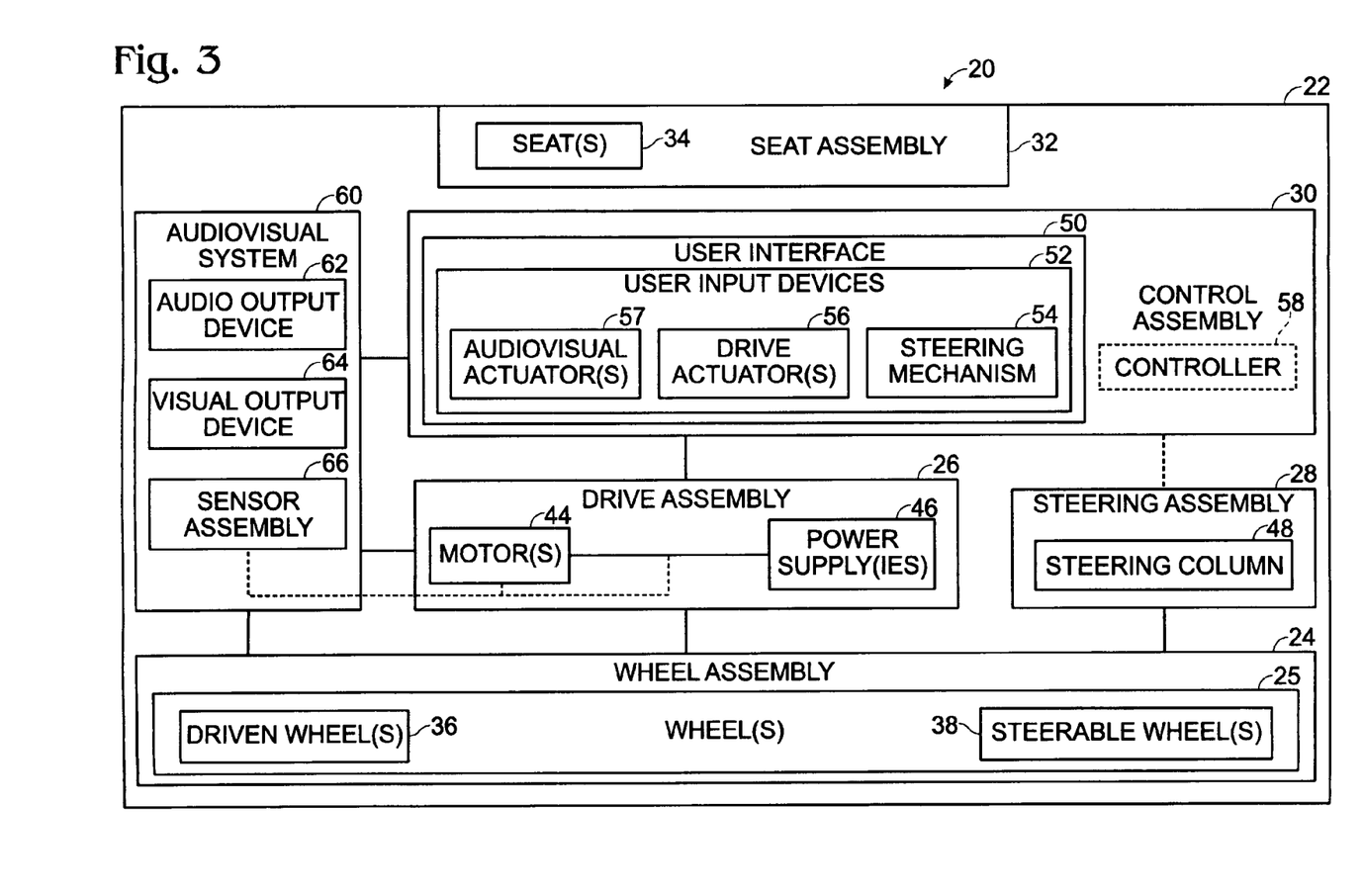
FIG. 3 is a block diagram of a children's ride-on vehicle with an operational-state responsive audiovisual system.

Examples of children's ride-on vehicles are shown in FIGS. 1-3 and indicated generally at 20. Children's ride-on vehicles 20 may include any suitable structure configured to allow a child riding on the vehicle to move across any suitable support surface. For example, two different children's ride-on vehicles are shown in FIGS. 1 and 2, and a generic children's ride-on vehicle is shown in FIG. 3. Each of those vehicles may include a body 22, a wheel assembly 24, a drive assembly 26, a steering assembly 28, and a control assembly 30.

The body may include any suitable structure configured to support one or more other components of the children's ride-on vehicle. For example, the body may include at least one seat assembly 32 that is sized and configured to accommodate at least one child. Seat assembly 32 may have any suitable configuration, including configurations in which the position of the seat assembly is adjustable within the passenger compartment, and configurations in which the seat assembly includes one or more seats or one or more seating regions.

Vehicle 20 may be sized for use by a child driver. Alternatively, the vehicle may be sized for use by a child driver and a child passenger. For example, seat assembly 32 may include one or more seats or seating regions 34 that are sized and positioned to receive a child driver and/or one or more child passengers. Alternatively, the seat assembly may include only a single seat or seating region.

Additionally, body 22 may be formed from any suitable materials. For example, the body may be formed from molded plastic and/or may be integrally formed or formed from a plurality of parts that may be secured together by screws, bolts, clips, and/or other suitable fasteners. Body 22 may additionally, or alternatively, be at least partially formed from other suitable material(s), such as metal, wood, and/or composite materials.

Moreover, the body may be shaped to generally resemble any suitable vehicle. For example, body 22 may be shaped to generally resemble an all-terrain vehicle. Alternatively, the body may be shaped to resemble corresponding full-sized, or adult-sized, vehicles, such as cars, trucks, construction vehicles, emergency vehicles, off-road vehicles, motorcycles, space vehicles, aircrafts, watercrafts, etc. Additionally, or alternatively, body 22 may be shaped to resemble fantasy vehicles that do not have a corresponding adult-sized counterpart.

Wheel assembly 24 may include a plurality of wheels 25 rotatably coupled to the body and/or configured to rotatably support the body on a support surface. For example, the plurality of wheels may include at least one driven wheel 36 and/or at least one steerable wheel 38. "Driven wheel," as used herein, refers to a wheel that is rotated directly in response to a rotational input from the vehicle's drive assembly, which is either directly conveyed to the wheel by the output of the motor(s) or conveyed through linkage, such as a gearbox, belt, chain, gear assembly, axle, etc.

The driven wheel may be configured to be driven by drive assembly 26 at any suitable speed(s) and/or direction(s). Steerable wheel 38 may be configured to be steered by steering assembly 28 toward any suitable direction(s).

The wheel assembly may include any suitable number of wheels, such as two wheels, three wheels, four or more wheels. A four-wheeled ride-on vehicle is illustrated in FIG. 1, and a two-wheeled ride-on vehicle is illustrated in FIG. 2. Any combination of those wheels may be driven and/or steerable. For example, when the plurality of wheels includes two front wheels and two rear wheels, all wheels may be driven (all-wheel drive configuration) with one or more of those wheels being steerable. Alternatively, the two front wheels may be steerable and the two rear wheels may be driven (rear-wheel drive configuration), or vice-versa (front-wheel drive configuration).

In some embodiments, wheel assembly 24 may include one or more tires 40 coupled to the wheels, and/or one or more inner tubes 42, as shown in FIGS. 1-2. At least a portion of the inner tubes may be disposed between the wheel and the tire. The tires and/or inner tubes may be on each of the wheels or on less than all of the wheels. For example, only the front and/or rear wheel(s) may have tires and/or inner tubes. In some embodiments, a wheel, a tire coupled to the wheel, and an inner tube may be referred to as a "tire system."

Drive assembly 26 may include any suitable structure configured to selectively drive the rotation of the at least one driven wheel. For example, the drive assembly may include at least one motor 44 and at least one power supply 46. The motor may be configured to drive the rotation of at least one of the driven wheels of the plurality of wheels. The motor may be described as providing an output that provides a rotational input to the driven wheel(s). The output may include one or more of a rotating shaft and/or a rotation pinion or output gear.

The drive assembly may include any suitable number of motors 44. For example, the drive assembly may include a single motor to drive the driven wheels. Alternatively, the drive assembly may include two motors where a first motor may drive a subset of the plurality of wheels, such as a first pair of a front wheel and a rear wheel, while a second motor may drive another subset of the plurality of wheels, such as a second pair of a front wheel and a rear wheel. Alternatively, drive assembly 26 may include more than two motors.

Motor 44 may additionally power other moveable components of vehicle 20. For example, the motor may power one or more components of a mechanical assembly (not shown). In some embodiments, the motor may move one or more mechanical members of the mechanical assembly. For example, the motor may move one or more of the mechanical members between extended and/or retracted positions.

Power supply 46 may include any suitable structure configured to provide power to the drive assembly. For example, the power supply may include one or more rechargeable batteries, capacitors, etc. Power supply 46 may be operably connected to the motor by any suitable electrical connectors, such as cables, wires, positive and negative terminals or leads, etc.

The drive assembly may additionally, or alternatively, be configured to receive driving inputs from a user, such as via control assembly 30, and to convey those driving inputs to the plurality of wheels. When the power supply includes one or more batteries, the drive assembly may be referred to as a "battery-powered drive assembly."

Although drive assembly 26 is shown to include motor 44 and power supply 46, the drive assembly may additionally, or alternatively, include any suitable components and/or assemblies configured to selectively drive the rotation of the at least one driven wheel. For example, drive assembly 26 may include a motor output linkage that transmits the rotational input from the motor's output(s) to the driven wheels. The linkage may include an intermediate linkage between the output and the driven wheel(s), such as a gearbox containing one or more gears, a belt or chain drive, a worm gear, one or more individual gears, etc.

Additionally, or alternatively, the motor output linkage may be configured to transmit the rotational input from the motor(s) to the driven wheel(s) at the same relative rate of rotation, or it may mechanically augment the rotational input to convey a greater or lesser rate of rotation relative to the rate of rotation of the output of the motor(s). Alternatively, the drive assembly may be formed without the motor output linkage, in which case the output(s) of the motor(s) may directly transmit the rotational input to the driven wheel(s).

Steering assembly 28 may include any suitable structure configured to selectively steer the at least one steerable wheel. For example, the steering assembly may include at least one steering column 48 and/or other mechanical linkage that receives steering inputs from control assembly 30 and steers one or more of the steerable wheels based, at least in part, on the steering inputs. The steering column may, for example, include an end portion distal the steering mechanism, with that end portion being coupled via a suitable tie rod or steering linkage, to steering collars, or steering levers, associated with one or more steerable wheels.

Control assembly 30 may include any suitable structure configured to receive user inputs and/or to convey those inputs to drive assembly 26 and/or steering assembly 28. For example, control assembly 30 may include a user interface 52 configured to receive user inputs, such as driving and/or steering inputs. The user interface may include one or more user control devices or user input devices 52. For example, the user input devices may include a steering mechanism 54, which may be any suitable structure configured to steer one or more of the steerable wheels via user-applied steering inputs to the steering mechanism. The steering mechanism may, for example, be in the form of steering wheel(s), handlebar(s), and/or steering lever(s).

Additionally, user input devices 52 may include one or more drive actuators 56, which may include any suitable structure configured to selectively energize the motor(s) responsive to a user input directing the power supply(ies) to actuate or otherwise energize the motor(s). For example, the drive actuators may include an on/off switch, a foot pedal, a throttle lever, and a rotational handgrip on a steering mechanism that includes a handlebar.

The user inputs, such as those conveyed via one or more of the drive actuators, may be adapted to select, or configure, the drive assembly within a plurality of drive configurations. Those user inputs may be referred to as configuration inputs and may be adapted to enable, or select, one or more of a plurality of drive configurations. Similarly, the drive actuator(s) utilized to receive the configuration inputs from a user, such as a child sitting on the ride-on vehicle's seat, may be referred to as configuration input devices.

The plurality of drive configurations may be realized, or implemented, when the motor(s) is energized, such as responsive to actuation/energization of the motor(s) by the battery (ies). For example, the plurality of drive configurations may include one or more of the direction (forward or reverse) in which the drive assembly may propel the vehicle upon energization of the motor(s), the relative speed or range of speed which the motor(s) may be configured/energized to provide, and/or whether the drive assembly may be able to be actuated responsive to an actuation input to drive actuator 56.

For example, speed drive configurations, such as "high" and "low" speed configurations, "high," "medium," and "low" speed configurations, etc., may be selected with one or more drive actuators, such as in the form of a speed switch. Those speed drive configurations may be realized (i.e., the vehicle may be propelled according to the selected speed drive configuration) upon actuation or energization of the motor(s). The speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by drive actuator 56, such as in the form of a direction switch. The direction switch may enable a user to select the relative direction (i.e., clockwise or counterclockwise) of rotation and thereby configure the vehicle to drive in forward and reverse directions upon energization of the motor(s).

A further example of drive configurations may be referred to as power configurations and may relate to whether or not the drive assembly's motor(s) is in an energized state in which the electric motor(s) may be driving the rotation of the driven wheel(s), or a de-energized state in which the motor(s) may not be driving the rotation of the driven wheel(s). In other words, when in the de-energized drive configuration, the motor(s) does not drive the rotation of the ride-on vehicle's driven wheel(s).

As an example, the drive assembly may be selectively configured from a de-energized drive configuration to an energized drive configuration responsive to a user, such as a child sitting on a seat of the ride-on vehicle, actuating one or more of the drive actuators. As discussed, this may include pressing or otherwise manipulating a throttle lever or button, or depressing a foot pedal.

The drive assembly may include any suitable structure to selectively enable the plurality of drive configurations. For example, different voltages may be applied to the motor(s) by reversing the polarity of the battery(ies) relative to the motor(s), which may switch between forward and reverse drive configurations. As another example, different voltages may be applied to the motors by switching two or more batteries and/or two or more motors between series and parallel configurations, which may lead to different relative speed configurations.

For example, when a single 12-volt battery is used with two motors, the motors may be switched between a series configuration in which 6 volts are applied to each of the two motors, and a parallel configuration in which 12 volts are applied to each of the two motors. Additionally, or alternatively, the polarity of the single battery may be reversed such that −6 volts (and/or −12 volts) are applied to each of the two motors. Alternatively, or additionally, the single battery may be disconnected from the two motors, which may be referred to as 0 volts being applied to each of the two motors.

In some embodiments, at least some of the plurality of voltages that may be applied to the electric motor(s) may correspond to a different drive configuration of the drive assembly when that voltage is applied to the electric motor(s). For example, the plurality of voltages may include a low forward voltage, a high forward voltage, a reverse voltage, and a braking voltage.

The low forward voltage may correspond, when applied to the electric motor(s), to a low forward drive configuration in which the electric motor(s) are adapted to drive the rotation of the driven wheel(s) in a forward direction at a first speed. In contrast, the high forward voltage may correspond, when applied to the electric motor(s), to a high forward drive configuration in which the electric motor(s) are adapted to drive the rotation of the driven wheel(s) in the forward direction at a second speed that is greater than the first speed.

The reverse voltage may correspond, when applied to the electric motor(s), to a reverse drive configuration in which the electric motor(s) are adapted to drive the rotation of the driven wheel(s) in a reverse direction. In contrast, the braking voltage may correspond, when applied to the electric motor(s), to a braking drive configuration in which the electric motor(s) are adapted not to (or is unable to) drive the rotation of the driven wheel(s).

As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation, or other duty cycle ramping, of the energization of the electric motor(s).

Although particular drive configurations are discussed, other suitable drive configurations are included in the present disclosure. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

User input devices 52 also may include audiovisual actuators 57, which may include any suitable structure configured to selectively operate an audiovisual system responsive to user input. For example, the audiovisual actuators may include an on/off switch, a volume switch, an operating mode switch, a selector switch, etc.

The user input devices may be positioned in any suitable portion(s) of the body, such as positioned to receive inputs from a child sitting on the at least one seat. For example, the user input devices may be located in any suitable location within or near the seat so that a child sitting on seat 34 may reach those devices while positioned to operate the vehicle, such as while having at least one hand on the steering mechanism.

In some embodiments, control assembly 30 may include a controller 58, which may control the operation of the drive assembly responsive to at least one of received user inputs and predetermined programming. As an example, controller 58 may be adapted to control electronically the transmission of a user-selected speed to the driven wheel(s) and/or to configure the drive assembly to the user-selected drive configuration. Controller 58 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 52, predetermined programming, and/or inputs from other sensors or switches.

When controller 58 is adapted to regulate the energization of the motor(s), it may regulate electronically the rotational input transmitted by the motor(s) to the driven wheel(s). For example, controller 58 may regulate at least one of the timing and the ramp, or rate, of application of the transmission of the rotational input after actuation of a corresponding user input device by a child sitting on seat 34. In other words, the controller may be configured to delay in at least time and/or rate of transmission the rotational input to the driven wheel assembly responsive at least in part to a user input selecting the desired, or selected, rotational input. An example of a suitable controller is disclosed in U.S. Pat. No. 6,771,034, the complete disclosure of which is herein incorporated by reference for all purposes.

In some embodiments, controller 58 may selectively control the transmission of the selected rotation input (such as determined by the selected speed configuration and/or actuation input). In other words, controller 58 may be configured to control the transmission of the selected rotational input in certain situations, such as when certain parameters or thresholds are satisfied. For example, controller 58 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), and/or when the ride-on vehicle changes direction.

The control assembly may be referred to as being configured to be in control communication with the drive and/or steering assemblies. "Control communication," as used herein, refers to the control assembly being physically connected, remotely connected, and/or connected in other suitable way(s) to allow the control assembly to convey user inputs to one or more other components of the children's ride-on vehicle, such as the drive and/or steering assemblies. Although control assembly 30 is shown to convey user inputs to drive assembly 26 and steering assembly 28, the control assembly may additionally, or alternatively, convey user inputs to other components of the children's ride-on vehicle.

Although children's ride-on vehicle 20 is shown to include body 22, wheel assembly 24, drive assembly 26, steering assembly 28, and control assembly 30, the children's ride-on vehicle may additionally, or alternatively, include any suitable structure configured to allow the children's ride-on vehicle to move across any suitable surface.

The children's ride-on vehicle also may include audiovisual system 60, which may include any suitable structure configured to generate one or more audio and/or visual outputs. For example, the audiovisual system may include at least one audio output device 62, at least one visual output device 64, and a sensor assembly 66, as shown in FIG. 3. In some embodiments, the audiovisual system may be referred to as an "electronics system."

The audio output device may include any suitable structure configured to generate one or more audio outputs. For example, audio output device 62 may include various circuit elements, such as loudspeakers, resistors, capacitors, diodes, transistors, voltage regulators, microcontrollers, etc.

The audio outputs may audibly indicate one or more operating states, conditions and/or parameters of the vehicle and/or environmental conditions. For example, the audio outputs may include simulated vehicle sounds that indicate whether the vehicle is accelerating, decelerating, backing-up, or idling. Alternatively, or additionally, the audio outputs may include verbal outputs, such as outputs that indicate that the vehicle is turning left, turning right, moving forward, moving in reverse, etc.

Additionally, or alternatively, the audio outputs may audibly indicate the particular drive configuration of the vehicle. For example, the audio outputs may include one or more low forward audio outputs, high forward audio outputs, reverse audio outputs, and braking audio outputs, which may correspond to the vehicle's low forward drive configuration, high forward drive configuration, reverse drive configuration, and braking drive configuration, respectively. The audio outputs may be prerecorded and/or may be produced by the audiovisual system.

Visual output device 64 may include any suitable structure configured to generate one or more visual outputs. For example, the visual output device may include various circuit elements, such as resistors, capacitors, diodes, transistors, voltage regulators, light emitting diodes, microcontrollers, etc.

The visual outputs may include light outputs, LED outputs, LCD outputs, etc. The light outputs may visually indicate one or more operating and/or environmental states, conditions and/or parameters of the vehicle. For example, the light outputs may visually indicate whether the vehicle is accelerating, decelerating, backing-up, or idling. Alternatively, or additionally, the light outputs may indicate whether the vehicle is turning left, turning right, moving forward, moving in reverse, etc.

Additionally, or alternatively, the visual outputs may visibly indicate the particular drive configuration of the vehicle. For example, the visual outputs may include one or more low forward visual outputs, high forward visual outputs, reverse visual outputs, and braking visual outputs, which may correspond to the vehicle's low forward drive configuration, high forward drive configuration, reverse drive configuration, and braking drive configuration, respectively.

Sensor assembly 66 may include any suitable structure adapted to detect one or more operating states (conditions and/or parameters) of the children's ride-on vehicle and/or one or more environmental conditions. For example, audiovisual system 60 may be adapted to detect the applied voltage to the electric motor(s).

Although sensor assembly 66 is described to be adapted to detect the applied voltage to the electric motor(s), the audiovisual system may alternatively, or additionally, detect one or more other operating states, conditions, and/or parameters. For example, audiovisual system 60 may detect when the steering mechanism has been turned more than a predetermined number of degrees to the left and/or to the right. Additionally, or alternatively, the audiovisual system may detect whether a drive actuator, such as a shifter, is moved to one or more particular positions.

Alternatively, or additionally, sensor assembly 66 may detect one or more environmental conditions. For example, the sensor assembly may detect wind speed, ambient air temperature, ambient air humidity, etc.

The audiovisual system may be adapted to generate one or more audio and/or visual outputs based, at least in part, on one or more detected operating states, conditions, and/or parameters (and/or on one or more detected environmental conditions). For example, the audio and/or visual output devices may generate one or more outputs based, at least in part, on the detected applied voltage.

In some embodiments, audiovisual system 60 may be adapted to generate at least one of a different audio output and a different visual output for each of two or more of the plurality of voltages applied to the electric motor(s). For example, the audiovisual system may be adapted to generate different audio and visual outputs for each of the voltages applied to the electric motor(s).

When audio and/or visual outputs are being generated, the audiovisual system may be adapted to interrupt the generation of those outputs when it detects a change in one or more operating states and/or environmental conditions. For example, audiovisual system 60 may be adapted to interrupt the generation of at least one of an audio output and a visual output when the audiovisual system detects a change in the applied voltage to the electric motor(s).

Additionally, or alternatively, the audiovisual system may be adapted to generate different audio and/or visual outputs after interrupting the generation of audio and/or visual outputs based, at least in part, on the changed operating state(s) and/or environmental condition(s). For example, audiovisual system 60 may be adapted to generate at least one of a different audio output and a different visual output based, at least in part, on the changed voltage to the electric motor(s).

Figure 4:
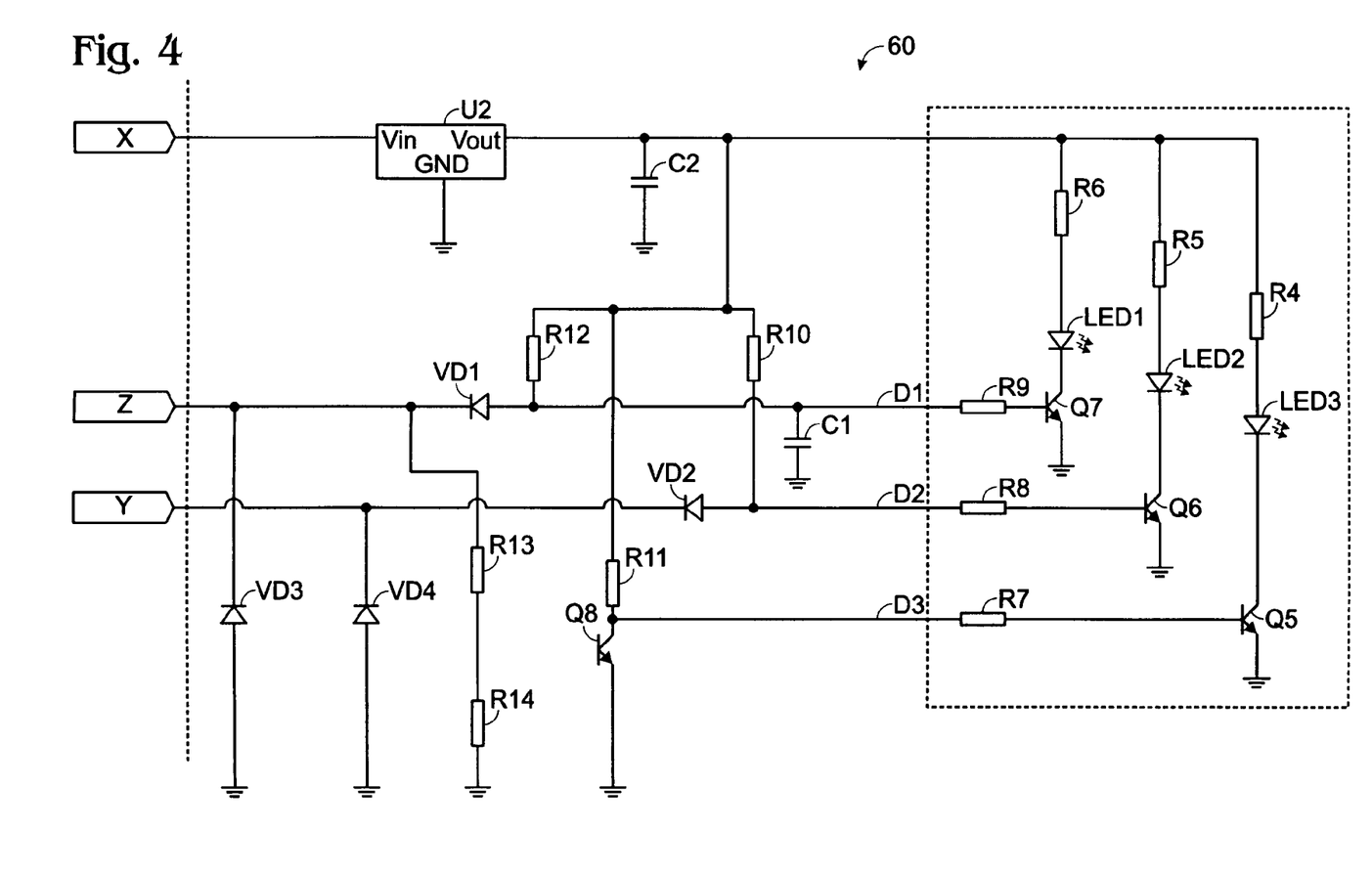
FIG. 4 is an example of the audiovisual system of FIGS. 1-3.
Figure 5:
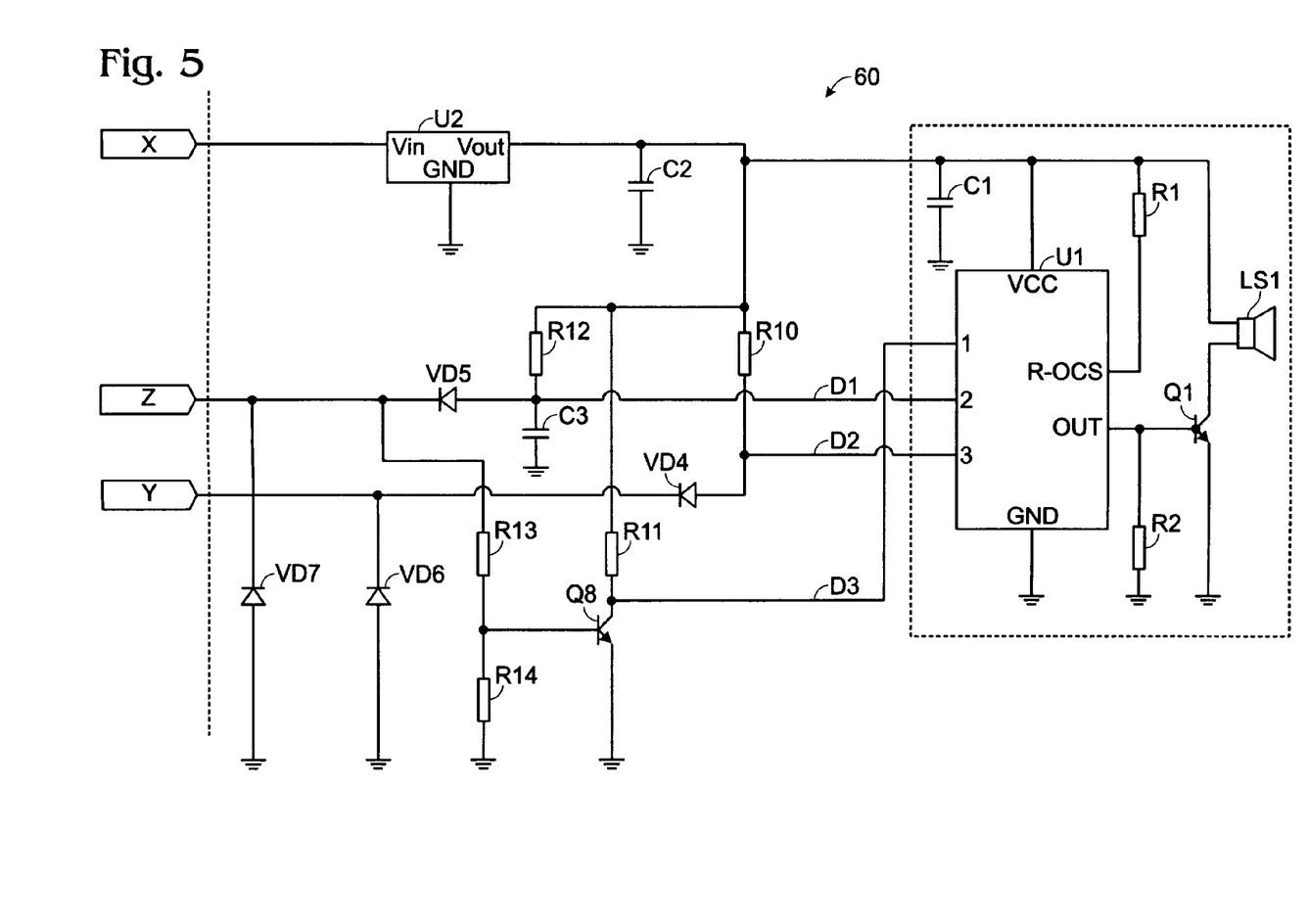
FIG. 5 is another example of the audiovisual system of FIGS. 1-3.

As shown in FIGS. 4-5, the audiovisual system may include various circuit elements, including capacitors C1-C3, light emitting diodes LED1-LED3, a loudspeaker LS1, transistors Q1 and Q7-Q8, resistors R1-R14, a microcontroller U1, a voltage regulator U2, and diodes VD1-7. The audiovisual system also may include one or more leads that connect to one or more other components of the vehicle.

For example, audiovisual system 60 may include leads X, Y, and Z. Lead X may be connected to the battery assembly, such as a positive terminal of at least one battery of that assembly. Additionally, or alternatively, leads Y and Z may be connected to one or more motors, such as negative and positive terminals of a single motor.

Additional information on the audiovisual systems shown in FIGS. 4-5 is provided below:

1. There are 3 wires connected between the Gear box and the Audiovisual system using a connector;

One wire connected to battery positive (X);

Two wires connected to Left Motor (M1) Positive (Z) and Negative (Y)

2. After measure the voltage of the given sample. The measurement result as shows below:

| | Voltage between | | |
|---|---|---|---|
| Direction of the car | Left Motor Z (red) to Y (black) | Battery GND to Z (red) | Battery GND to Y (black) |
| Forward (H) | +12 V | +12 V | 0 |
| Forward (L) | +6 V | +6 V | 0 |
| Reverse (L) | −6 V | +6 V | +12 V |
| Stop | 0 V | 0 | 0 |

3. Operating theory

When the motor operated at different speed and direction we got the signals for D1, D2 and D3, as show below:

| Direction of the car | Voltage between M1 (Z to Y) | D1 | D2 | D3 |
|---|---|---|---|---|
| Forward (H) | +12 V | 1 | 0 | 0 |
| Forward (L) | +6 V | 1 | 0 | 1 |
| Reverse (L) | −6 V | 0 | 1 | 1 |
| Stop | 0 V | 0 | 0 | 1 |

4. The sound effect and sequence as show below Status Table:

| Status (D1, D2, D3) | | | |
|---|---|---|---|
| Present | Change to* | Sound | Sound period |
| 110 (H) 010 (L) 001 (R) | 000 | Dwnshiftchirp | Play the sound once |
| 000 | 001 (R) | backupbeep | Repeat/Once |
| | 010 (L) | TBD | Repeat/Once |
| | 110 (H) | TBD | Repeat/Once |
| 110 (H) | 010 (L) | downshift | Repeat/Once |
| 010 (L) | 110 (H) | upshift | Repeat/Once |

*Change to the new status for 0.2 seconds validate the status then play the sound.

Although separate examples of the audiovisual system are shown in FIGS. 4-5, those examples, or one or more components from those examples, may be combined in any suitable way. Additionally, although specific examples of the audiovisual system are shown in FIGS. 4-5, the audiovisual system may alternatively, or additionally, include any suitable structure configured to generate one or more audio and/or visual outputs.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
   a body having at least one seat sized for a child;
   a plurality of wheels rotatably coupled to the body, wherein the plurality of wheels includes at least one driven wheel;
   a drive assembly adapted to selectively drive the rotation of the at least one driven wheel, wherein the drive assembly comprises:
   at least one electric motor,
   a battery assembly including at least one battery and adapted to provide a plurality of voltages to the at least one electric motor, and
   at least one user input device positioned to receive inputs from a child sitting on the at least one seat, and adapted to select among the plurality of voltages and to apply that selected voltage to the at least one electric motor; and
   an electronics system adapted to detect the applied voltage to the at least one electric motor and to generate at least one of an audio output and a visual output based, at least in part, on the applied voltage, wherein the electronics system is further adapted to interrupt the generation of the at least one of an audio output and a visual output when the electronics system detects a change in the applied voltage to the at least one electric motor.

2. The vehicle of claim 1, wherein the electronics system is further adapted to generate at least one of a different audio output and a different visual output for each of two or more of the plurality of voltages applied to the at least one electric motor.

3. The vehicle of claim 2, wherein the electronics system is further adapted to generate at least one of a different audio output and a different visual output for each of the plurality of voltages applied to the at least one electric motor.

4. The vehicle of claim 1, wherein each of the plurality of voltages is included in one of a plurality of voltage ranges, and wherein the electronics system is further adapted to generate at least one of a different audio output and a different visual output for each of the plurality of voltage ranges applied to the at least one electric motor.

5. The vehicle of claim 1, wherein the electronics system is further adapted to generate at least one of a different audio output and a different visual output after interrupting the generation of the at least one of an audio output and a visual output based, at least in part, on the changed voltage to the at least one electric motor.

6. The vehicle of claim 1, wherein the drive assembly is adapted to selectively drive the rotation of the at least one driven wheel in a plurality of drive configurations, and wherein each of the plurality of voltages corresponds to a different drive configuration of the drive assembly when that voltage is applied to the at least one electric motor.

7. The vehicle of claim 6, wherein the plurality of voltages includes a low forward voltage that corresponds, when applied to the at least one electric motor, to a low forward drive configuration in which the at least one electric motor is adapted to drive the rotation of the at least one driven wheel in a forward direction at a first speed.

8. The vehicle of claim 7, wherein the electronics system is further adapted to detect the applied low forward voltage and to generate at least one of a low forward audio output and a low forward visual output based, at least in part, on the applied low forward voltage.

9. The vehicle of claim 7, wherein the plurality of voltages includes a high forward voltage that corresponds, when applied to the at least one electric motor, to a high forward drive configuration in which the at least one electric motor is adapted to drive the rotation of the at least one driven wheel in the forward direction at a second speed that is greater than the first speed.

10. The vehicle of claim 9, wherein the electronics system is further adapted to detect the applied high forward voltage and to generate at least one of a high forward audio output and a high forward visual output based, at least in part, on the applied high forward voltage.

11. The vehicle of claim 6, wherein the plurality of voltages includes a reverse voltage that corresponds, when applied to the at least one electric motor, to a reverse drive configuration in which the at least one electric motor is adapted to drive the rotation of the at least one driven wheel in a reverse direction.

12. The vehicle of claim 11, wherein the electronics system is further adapted to detect the applied reverse voltage and to generate at least one of a reverse audio output and a reverse visual output based, at least in part, on the applied reverse voltage.

13. The vehicle of claim 6, wherein the plurality of voltages includes a braking voltage that corresponds, when applied to the at least one electric motor, to a braking drive configuration in which the at least one electric motor is adapted not to drive the rotation of the at least one driven wheel.

14. The vehicle of claim 13, wherein the electronics system is further adapted to detect the applied braking voltage and to generate at least one of a braking audio output and a braking visual output based, at least in part, on the applied braking voltage.

15. A children's ride-on vehicle, comprising:
   a body having at least one seat sized for a child;
   a plurality of wheels rotatably coupled to the body, wherein the plurality of wheels includes at least one driven wheel;
   a drive assembly adapted to selectively drive the rotation of the at least one driven wheel in a plurality of drive configurations, wherein the drive assembly comprises:
   at least one electric motor,
   a battery assembly including at least one battery and adapted to provide a plurality of voltages to the at least one electric motor, and
   at least one user input device positioned to receive inputs from a child sitting on the at least one seat, and adapted to select among the plurality of voltages and to apply that selected voltage to the at least one electric motor; and
   an electronics system adapted to detect the applied voltage to the at least one electric motor and to generate at least one of an audio output and a visual output based, at least in part, on the applied voltage, wherein each of the plurality of voltages corresponds to a different drive configuration of the drive assembly when that voltage is applied to the at least one electric motor, wherein the electronics system is further adapted to interrupt the generation of the at least one of an audio output and a visual output when the electronics system detects a change in the applied voltage to the at least one electric motor.

16. The vehicle of claim 15, wherein the electronics system is further adapted to generate at least one of a different audio output and a different visual output after interrupting the generation of the at least one of an audio output and a visual output based, at least in part, on the changed voltage to the at least one electric motor.

17. The vehicle of claim 15, wherein the electronics system is further adapted to generate at least one of a different audio output and a different visual output for each of the plurality of voltages applied to the at least one electric motor.

18. A children's ride-on vehicle, comprising:
  a body having at least one seat sized for a child;
  a plurality of wheels rotatably coupled to the body, wherein the plurality of wheels includes at least one driven wheel;
  a drive assembly adapted to selectively drive the rotation of the at least one driven wheel in a plurality of drive configurations, wherein the drive assembly comprises:
    at least one electric motor,
    a battery assembly including at least one battery and adapted to provide a plurality of voltages to the at least one electric motor, and
    at least one user input device positioned to receive inputs from a child sitting on the at least one seat, and adapted to select among the plurality of voltages and to apply that selected voltage to the at least one electric motor; and
  an electronics system adapted to (1) detect the applied voltage to the at least one electric motor and to generate at least one of an audio output and a visual output based, at least in part, on the applied voltage, (2) interrupt the generation of the at least one of an audio output and a visual output when the electronics system detects a change in the applied voltage to the at least one electric motor, and (3) generate at least one of a different audio output and a different visual output after interrupting the generation of the at least one of an audio output and a visual output based, at least in part, on the changed voltage to the at least one electric motor.

* * * * *